March 12, 1957 — E. B. MILLER ET AL — 2,784,798
METHOD OF AND APPARATUS FOR FLASH SEPARATING HYDROCARBONS
Filed Aug. 24, 1955
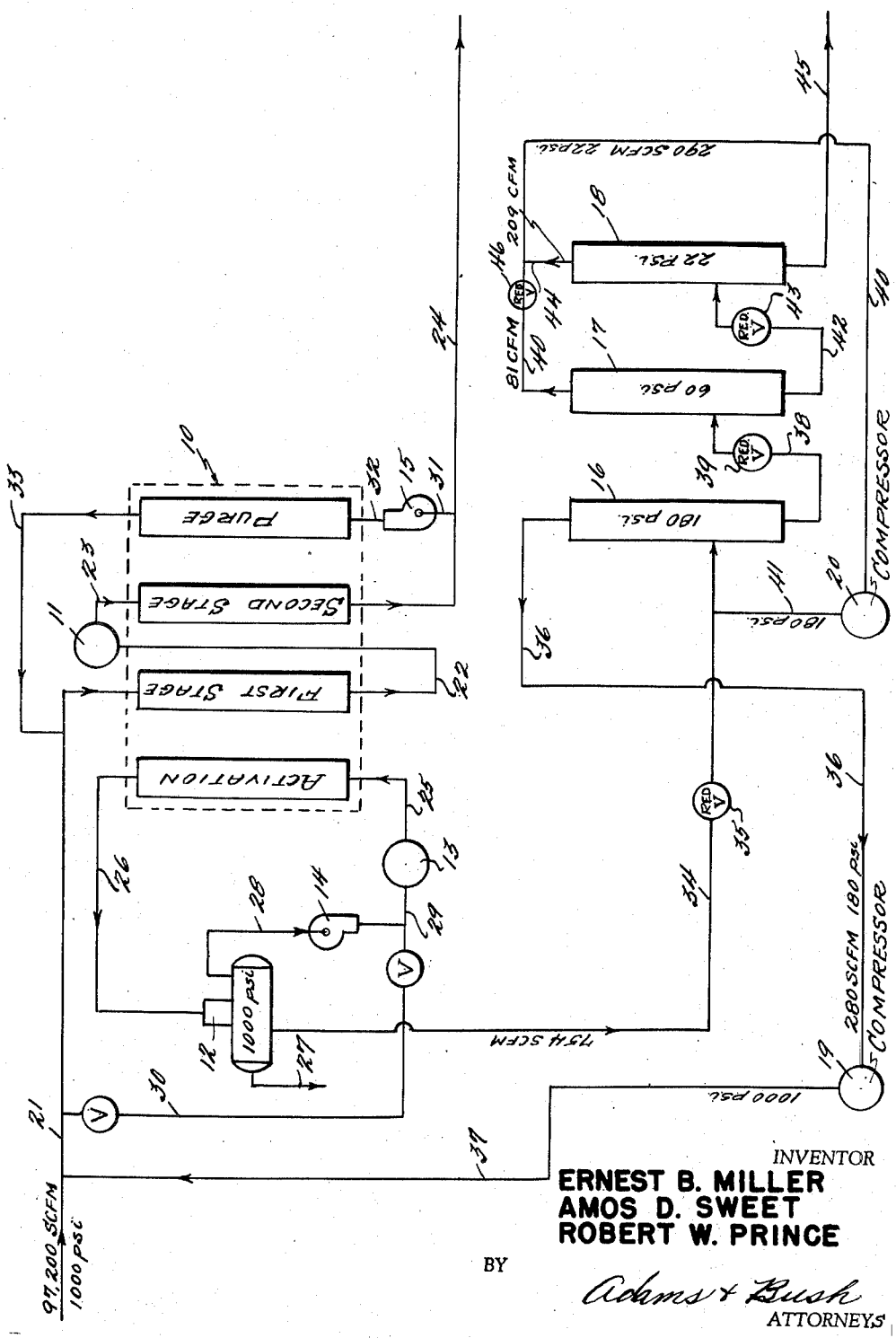
INVENTOR
ERNEST B. MILLER
AMOS D. SWEET
ROBERT W. PRINCE
BY
Adams + Bush
ATTORNEYS

United States Patent Office 2,784,798
Patented Mar. 12, 1957

2,784,798

METHOD OF AND APPARATUS FOR FLASH SEPARATING HYDROCARBONS

Ernest B. Miller, Amos D. Sweet, and Robert W. Prince, Houston, Tex., assignors to Jefferson Lake Sulphur Company, New Orleans, La., a corporation of New Jersey Application August 24, 1955, Serial No. 530,358

4 Claims. (Cl. 183—4.3)

This invention relates to the recovery of condensable hydrocarbons from fluid mixtures containing hydrocarbons and has more particular reference to a method of and apparatus for recovering stabilized hydrocarbon liquids from high pressure hydrocarbon mixtures.

One object of the present invention is to provide a novel method of and apparatus for recovering stabilized hydrocarbon liquids from high pressure hydrocarbon mixtures.

Another object of the invention is to provide a novel method of and system for recovering stabilized hydrocarbon liquids from high pressure hydrocarbon mixtures including collecting and/or maintaining the high pressure hydrocarbon mixture in a pressure vessel, in liquid form, directing a continuous flow of the liquid mixture from the pressure vessel directly and in succession through a series of flash separators, reducing the pressure of the liquid to a predetermined pressure prior to its entry into each of the flash separators, whereby only predetermined volatile components of the liquid mixture will flash off into vapor in each of the separators; withdrawing the overhead vapors from the first separator of the series of separators; withdrawing the overhead vapors from the remainder of the separators, compressing it and reintroducing it into the first separator; and continuously withdrawing the liquid from the last of the separators which forms the stabilized hydrocarbon liquid product.

Another object of the invention is to provide a novel method of and system for recovering stabilized hydrocarbon liquids from high pressure hydrocarbon mixtures, as characterized above, wherein the high pressure hydrocarbon mixture is obtained from natural gas by the use of an adsorber in which the condensable hydrocarbons are adsorbed and subsequently removed and condensed in a high pressure condenser, and wherein the withdrawn overhead vapors from the first separator are compressed and reintroduced along with the natural gas into the adsorber.

Other objects and advantages of the invention will appear in the specification, when considered in connection with the accompanying drawing, in which the figure is a diagrammatic view showing one embodiment of apparatus and the arrangement thereof for carrying out the method of the invention.

The present invention provides a novel and improved method of and apparatus for recovering stabilized hydrocarbon liquids from high pressure hydrocarbon mixtures which have been obtained from natural gas and are maintained in liquid form under high pressure in a pressure vessel such as a condenser.

In general, the present invention comprises a series of three or more flash separators through which the liquid from the pressure vessel container (condenser) passes in succession. The conduits through which the liquid passes from the condenser and from one separator to the other are provided with pressure regulators so that the liquid can be introduced into each separator at a predetermined pressure, whereby the volatile components of the liquid which will flash off in the separators will be controlled by the predetermined setting of the pressure regulators. The overhead vapors from all but the first of the series of separators are continuously collected and compressed and reintroduced along with the new feed entering the first separator from the condenser. By proper setting of the pressure regulating valves, thereby controlling the particular volatile components which flash off in each separator, the liquid from the last separator will contain substantially only the desired components in the form of a stabilized product. The invention further contemplates the obtaining of the high pressure hydrocarbon mixtures from natural gas by the use of an adsorber in which the condensable hydrocarbons are adsorbed and subsequently removed and condensed in a high pressure condenser. When an adsorber is employed, the withdrawn overhead vapors from the first of the series of flash separators are compressed and reintroduced, along with the natural gas, into the adsorber.

Referring now to the drawing, there is schematically shown one embodiment of apparatus and the arrangement thereof for carrying out the method of the present invention. The apparatus shown comprises an adsorber 10 employed to adsorb the hydrocarbons from the gas being treated; an intercooler 11 employed to cool the gas being treated between the first and second adsorption stages of the adsorber; a condenser-separator 12 employed to condense the hydrocarbons contained in the activation gas after it has passed through the reactivation stage of the adsorber; a heater 13 for heating the activation gas; a blower 14 for recirculating the activation gas through the adsorber; a blower 15 for forcing the purging gaas through the adsorber; a plurality of flash separators, three such being shown and numbered 16, 17 and 18; a compressor 19 for returning the flash vapor from the first separator to the incoming gas to be treated on its way to the adsorber; and a compressor 20 for recycling the flash vapor from the separators 17 and 18 back into the separator 16.

The adsorber 10 and the auxiliary apparatus employed therewith may be of any suitable usual type such as shown in Patent No. 2,507,608, for Apparatus for Dehydrating Gas and Recovering Condensable Hydrocarbons Therefrom, issued on May 16, 1950, to Ernest B. Miller. However, preferably and as illustrated, the adsorber 10 and the auxiliary equipment employed therewith are identical in construction to that shown in the co-pending application of Ernest B. Miller, for Fluid Treating Apparatus, filed January 26, 1954, Ser. No. 406,310, now Patent No. 2,751,033.

The gas being treated is delivered, at high pressure, from the usual compressor or source of supply (not shown) to the first stage of the adsorber by means of a pipe line 21. After passing through the first stage of the adsorber, during which passage some of the condensable hydrocarbons were removed, next the gas passes through pipe line 22 into the intercooler 11. From the intercooler, the cooled gas passes through a pipe line 23 into the second adsorption stage of the adsorber, wherein additional hydrocarbons are removed, and from the second adsorption stage the gas passes through pipe line 24 to its various points of use.

The removal and recovery of the hydrocarbons from the beds of adsorbent material are effected in the third or activation stage of the adsorber. The activation gas, a captive gas, is heated in the heater 13, where its temperature is raised to from 300° F. to 600° F. From the heater, the heated activation gas passes through pipe line 25 into the activation stage of the adsorber and, as the hot gas passes through the adsorbent material, it removes the hydrocarbons therefrom. From the activation stage, the activation gas, with the hydrocarbon vapor, passes through pipe line 26 into the condenser-separator 12, where the hydrocarbons are condensed and separated from any water which may be present, the water being drained from the bottom of the separator by means of a small drain line 27.

From the condenser-separator, the now stripped captive gas passes through a pipe line 28 to the blower 14 and is recirculated by the blower through pipe line 29 and heater 13 back through the activation stage. This recirculation process is continuous.

The captive stream of gas in the activation system is circulated, by means of the blower 14, through the heater 13, the activation stage of the adsorber, and the condenser-separator 12. The composition of this stream will build up gradually in terms of vapor, composed chiefly of hydrocarbons, until the dew point of the captive gas stream reaches condenser temperature, and will thereafter yield as liquid all of the condensable vapors adsorbed in the reactivation stage of the adsorber.

While it is not necessary to provide outside gas for use as the captive activation gas, in order to speed up the initial operation of the apparatus, it may be desirable to do so. Accordingly, gas may be diverted from the supply line 21, through a pipe line 30, to the pipe line 29 for initial operation.

The gas used as the purging medium may be taken from the pipe line 24 through pipe line 31, passes through blower 15 and then through pipe line 32 into the purging stage of the adsorber. As the purging gas passes through the purging stage, it purges the adsorbent material therein by removing all remaining activation gas and any remaining condensable hydrocarbons deposited on the adsorbent material.

From the purging stage, the purging gas passes through pipe line 33 into the flow of the gas on the way to the first adsorption stage of the adsorber.

From the condenser 12, the liquid hydrocarbons pass through pipe line 34 and a pressure regulator 35, set to reduce the pressure of the liquid to a predetermined pressure, into the first flash separator 16, wherein certain of the lowest volatile components of the liquid will flash off as vapor and pass from the top of the flash separator through pipe line 36 to the compressor 19, where they are compressed and pass through pipe line 37 back into pipe line 21 carrying the natural gas on its way to the first adsorption stage of the adsorber.

The liquid hydrocarbons in the first flash separator which did not flash into vapor pass through pipe line 38 and a pressure regulator 39, set to reduce the pressure of the liquid to a predetermined pressure, into the second flash separator 17, where certain other of the volatile components of the liquid will flash off as vapor and pass from the top of the flash separator through pipe line 40 to the compressor 20, where it will be compressed to the pressure of the first flash separator and sent through pipe line 41 into the pipe line 34, where it joins the liquid hydrocarbons from the condenser on their way to the first flash separator.

The liquid hydrocarbons in the second flash separator which did not flash off into vapor pass through pipe line 42 and a pressure regulator 43, set to reduce the pressure of the liquid to a predetermined pressure, into the third flash separator 18, where certain other of the volatile components of the liquid will flash off as vapor and pass from the top of the flash separator through pipe line 44 into pipe line 40 for recirculation through the flash separators. From the bottom of the third flash separator 18, the now stabilized liquid passes through pipe line 45 to storage into suitable containers. Preferably, and as shown, a pressure reducing valve 46 is placed in the pipe line 40 between the connection thereto of the flash separators 17 and 18.

The foregoing process may be employed for stabilizing various types of liquid hydrocarbon mixtures which have been removed from natural gas by desorption of the condensable hydrocarbons from the natural gas in the adsorber.

The following table shows calculations made to predict the compositions and quantities involved when using this process of the invention to obtain 22 lb. Reid vapor pressure gasoline from 140 million cubic feet per day of a natural gas flowing at 1000 p. s. i. with the temperatures, pressures and rates of flow as indicated in the drawing:

|  | Condenser | First Separator | | Second Separator | | Final Separator | |
| --- | --- | --- | --- | --- | --- | --- | --- |
| Pressure | 1,000 p. s. i. | 180 p. s. i. | | 60 p. s. i. | | 22 p. s. i. | |
| Temperature | 130° F. | 100° F. | | 100° F. | | 100° F. | |
|  | Mol percent | Mol percent | | Mol percent | | Mol percent | |
|  | Liquid | Vapor | Liquid | Vapor | Liquid | Vapor | Liquid |
| $CO_2$ | 4.53 | 12.20 | 1.49 | 1.02 | .46 | 1.45 | .02 |
| $C_1$ | 23.50 | 63.32 | 4.08 | 3.25 | .72 | 2.30 | .02 |
| $C_2$ | 1.38 | 3.58 | 1.11 | .53 | .61 | 1.82 | .08 |
| $C_3$ | 3.44 | 6.28 | 6.00 | 1.37 | 5.08 | 12.74 | 1.71 |
| $iC_4$ | 6.30 | 5.14 | 11.32 | 1.29 | 11.14 | 20.72 | 6.92 |
| $nC_4$ | 6.87 | 3.83 | 11.59 | 1.01 | 11.77 | 18.97 | 8.60 |
| $iC_5$ | 16.70 | 3.21 | 22.44 | .87 | 24.07 | 22.67 | 24.69 |
| $nC_5$ | 12.85 | 1.79 | 16.27 | .48 | 17.62 | 13.59 | 19.40 |
| $C_6$ | 12.86 | .53 | 13.95 | .15 | 15.43 | 4.64 | 20.18 |
| $C_7+$ | 11.57 | .12 | 11.75 | .03 | 13.10 | 1.10 | 18.38 |
|  | 100.00 | 100.00 | 100.00 | 100.00 | 100.00 | 100.00 | 100.00 |

The method may also be employed for stabilizing other types of liquid hydrocarbon mixtures, as for example, butanes or propanes. For these other types of liquid products, it will only be necessary to select suitable intermediate pressures at which to make the flash separations, and a final separator pressure which will yield the desired product. The recompression and recycling of the flash vapors is then carried out at the selected flow and pressure conditions.

From the foregoing, it readily is apparent that there has been provided a novel method and system for recovering stabilized hydrocarbon liquids from high pressure hydrocarbon mixtures; a system which is simple in construction, efficient in operation, and extremely flexible in its adaptations.

Obviously, the invention is not restricted to the particular embodiment thereof herein shown and described.

What is claimed is:

1. A system for recovering stabilized hydrocarbon liquids from a gas containing condensable hydrocarbons comprising an adsorber; means including conduits for directing a continuous flow of the gas through said adsorber whereby said condensable hydrocarbons will be adsorbed from the gas; means including a heater, a blower and conduits for continuously directing a flow of an activating medium through said adsorber whereby the adsorbed condensed hydrocarbons will be vaporized and removed from the adsorber; means including a condenser for separating and condensing the vaporized hydrocarbons carried by said activating medium after its passage through said adsorber; a series of flash separators; a conduit connecting the first flash separator of said series of separators and said condenser and having a pressure reducing valve therein adapted to be set to reduce the pressure of the liquid passing from the condenser to said first separator to a predetermined pressure so that predetermined volatile components of the liquid will flash into vapor in the first separator; means for withdrawing the overhead vapors from said first separator; a plurality of conduits for the passage of unvaporized liquid from one separator to the other, one connecting each of said flash separators with the preceding flash separator in said series of flash separators and having a pressure reducing valve therein adapted to be set to reduce the pressure of the liquid passing therethrough to a predetermined pressure; means including conduits and a compressor for withdrawing the overhead vapors from all of said flash separators other than the said first flash separator and compressing the withdrawn vapor and returning it to said first flash separator; and means including a conduit for withdrawing the stabilized liquid from the last of said series of flash separators.

2. Apparatus as set forth in claim 1, wherein said means for withdrawing the overhead vapors from said first flash separator include a compressor and conduits for compressing the withdrawn vapor and returning it to the flow of the gas being treated on its way to the adsorber.

3. In the recovery of condensable hydrocarbons from natural gas involving the contact of adsorbent material with the gas with resultant adsorption of the condensable hydrocarbons by the adsorbent material and the subsequent treatment of the adsorbent material with a heated medium to vaporize and remove the condensable hydrocarbons and thereby reactivate the adsorbent material for further contact with the natural gas and the subsequent condensation of the desorbed hydrocarbons under high pressure in a condensing zone to liquefy the hydrocarbons, the improvement which comprises directing a continuous flow of the hydrocarbon mixture from the condensing zone directly and in succession into and through a series of flash separating zones; reducing the pressure of the liquid mixture to a predetermined pressure prior to its entry into each of the flash separating zones, whereby only predetermined volatile components of the liquid mixture will flash into vapor in each of the separating zones; continuously withdrawing the overhead vapors from the first flash separating zone of said series of flash separating zones; continuously withdrawing the overhead vapors from the remainder of the separating zones, compressing it and reintroducing it into said first separating zone; and continuously withdrawing the liquid from the last of said separating zones as the finished product.

4. The method as set forth in claim 3, wherein the withdrawn vapors from said first flash separating zone are compressed and mixed with the natural gas on its way to the adsorber.

References Cited in the file of this patent
UNITED STATES PATENTS

| | | |
|---|---|---|
| 2,250,925 | Babcock | July 29, 1941 |
| 2,301,520 | Carney | Nov. 10, 1942 |
| 2,307,024 | Carney | Jan. 5, 1943 |
| 2,486,543 | Wenzke | Nov. 1, 1949 |